(12) United States Patent
Lee

(10) Patent No.: US 9,194,186 B2
(45) Date of Patent: Nov. 24, 2015

(54) METHODS AND SYSTEM FOR LUBRICATION PRESSURE RELIEF FOR A ROLLER CONE DRILL BIT

(71) Applicant: Young H. Lee, Conroe, TX (US)

(72) Inventor: Young H. Lee, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 557 days.

(21) Appl. No.: 13/653,963

(22) Filed: Oct. 17, 2012

(65) Prior Publication Data

US 2014/0102790 A1    Apr. 17, 2014

(51) Int. Cl.
*E21B 44/00* (2006.01)
*E21B 10/24* (2006.01)
*F16C 33/66* (2006.01)

(52) U.S. Cl.
CPC ............... *E21B 10/24* (2013.01); *F16C 33/66* (2013.01); *F16C 2352/00* (2013.01)

(58) Field of Classification Search
CPC ....... E21B 10/24; E21B 10/25; E21B 10/246; F16C 33/66; F16C 2352/00; F16C 33/6607; F16C 33/6651
See application file for complete search history.

(56) References Cited

U.S. PATENT DOCUMENTS

| | | | |
|---|---|---|---|
| 3,251,634 A * | 5/1966 | Dareing | 384/93 |
| 3,719,241 A * | 3/1973 | Bell | 175/228 |
| 3,841,422 A * | 10/1974 | Crow | 175/229 |
| 3,866,695 A | 2/1975 | Jackson | |
| 4,448,268 A | 5/1984 | Fuller | |
| 5,027,911 A | 7/1991 | Dysart | 175/57 |
| 5,441,120 A | 8/1995 | Dysart | 175/228 |
| 5,628,375 A * | 5/1997 | Daly | 175/227 |
| 6,206,110 B1 | 3/2001 | Slaughter, Jr. et al. | |
| 6,264,367 B1 | 7/2001 | Slaughter, Jr. et al. | 384/94 |
| 6,698,536 B2 | 3/2004 | Moran et al. | 175/57 |
| 6,802,380 B2 * | 10/2004 | Blackman | 175/228 |
| 8,347,986 B2 * | 1/2013 | Anderele | 175/228 |
| 8,746,374 B2 * | 6/2014 | Harrington et al. | 175/359 |
| 8,800,689 B2 * | 8/2014 | Crawford | 175/228 |
| 2002/0108788 A1 * | 8/2002 | Peterson et al. | 175/228 |
| 2003/0019666 A1 | 1/2003 | Portwood et al. | 175/371 |
| 2003/0024743 A1 | 2/2003 | Peterson | 175/371 |

(Continued)

OTHER PUBLICATIONS

International Search Report and Written Opinion; PCT/US2013/063799; pp. 10, Jan. 20, 2014.

(Continued)

*Primary Examiner* — Daniel P Stephenson
(74) *Attorney, Agent, or Firm* — Baker Botts L.L.P.

(57) ABSTRACT

According to one embodiment, the disclosure relates to a roller cone drill bit including a bit body having at least one support arm extending therefrom, a cone assembly containing bearings or retaining balls and rotatably mounted on a journal extending from each support arm, a lubricant reservoir disposed in each support arm, a lubricant chamber disposed in each support arm and fluidly coupled to the bearings or retaining balls, a bore disposed in each support arm to communicate lubricant between the lubricant reservoir and the lubricant chamber, and a pressure release mechanism disposed within the bore. The pressure release mechanism may be operable to relieve lubricant from the lubricant reservoir into the lubricant chamber when lubricant pressure within the lubricant reservoir exceeds pressure of the lubricant in the lubricant chamber. According to another embodiment, the disclosure relates to methods of relieving lubricant in such a bit.

12 Claims, 8 Drawing Sheets

(56) References Cited

U.S. PATENT DOCUMENTS

2003/0062200 A1    4/2003    Blackman ..................... 175/228
2010/0230170 A1    9/2010    Crawford et al.
2011/0017514 A1    1/2011    Anderele
2014/0102790 A1*  4/2014    Lee ................................ 175/24

OTHER PUBLICATIONS

International Preliminary Report on Patentability; PCT/US2013/063799; pp. 7 Pages, Apr. 30, 2015.

* cited by examiner

METHODS AND SYSTEM FOR LUBRICATION PRESSURE RELIEF FOR A ROLLER CONE DRILL BIT

TECHNICAL FIELD

The present disclosure is related to roller cone drill bits and more particularly to methods and systems for lubrication pressure relief for a roller cone drill bit.

BACKGROUND OF THE DISCLOSURE

Roller cone drill bits have been and are currently used to form wellbores in subterranean formations. Such drill bits generally include at least one support arm and often three support arms. A respective cone assembly may be rotatably mounted on interior portions of each support arm.

Each cone assembly often includes a base with a cavity or opening formed therein. Each cone cavity may be sized to receive exterior portions of an associated journal or spindle to allow rotation of the cone assembly relative to the associated journal or spindle while drilling a wellbore. A wide variety of bearings, bearing assemblies, bearing surfaces, seals and/or other supporting structures may be disposed between interior portions of each cone assembly and exterior portions of the associated journal or spindle.

Roller cone drill bits often include lubricant systems to supply lubricant to journals, bearings, bearing assemblies, bearing surfaces, seals and/or other supporting structures associated with rotation of each cone assembly mounted on a respective support arm. A variety of lubricants may be used with roller cone drill bits to accommodate rotation of each cone assembly relative to the respective spindle. A wide variety of seals and seal assemblies may be used to block communication between downhole well fluids and lubricants associated with rotation of each cone assembly. Various types of systems have been used to maintain lubricant system pressure to minimize potential damage to bearings, bearing assemblies, seals, journals and other supporting structures associated with rotation of a cone assembly relative to an associated support arm.

SUMMARY OF THE DISCLOSURE

According to one embodiment, the present disclosure relates to a roller cone drill bit including a bit body having at least one support arm extending therefrom, a cone assembly containing bearings or retaining balls and rotatably mounted on a journal extending from each support arm, a lubricant reservoir disposed in each support arm, a lubricant chamber disposed in each support arm and fluidly coupled to the bearings or retaining balls, a bore disposed in each support arm to communicate lubricant between the lubricant reservoir and the lubricant chamber, and a pressure release mechanism disposed within the bore. The pressure release mechanism may be operable to relieve lubricant from the lubricant reservoir into the lubricant chamber when lubricant pressure within the lubricant reservoir exceeds pressure of the lubricant in the lubricant chamber. In more specific embodiments, the pressure release mechanism may include a floating bead or a check value. Also in more specific embodiments, the bore may contain an opening to allow lubricant communication between the lubricant reservoir and the lubricant chamber.

According to another embodiment, the present disclosure relates to a method for lubricant pressure relief including relieving a lubricant from a lubricant reservoir into a lubricant chamber whenever pressure in the lubricant reservoir exceeds pressure in the lubricant chamber by opening a pressure relief mechanism. The pressure relief mechanism may be disposed in a roller cone drill bit as described above. In particular embodiments, the method may include moving a floating ball or opening a check valve to allow relieving a lubricant.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

The present disclosure relates to systems and methods for pressure relief in a roller cone drill bit. In particular it relates to systems and methods in which grease from a primary pressure compensation system which would otherwise be expelled from the bit is instead diverted into an intergland lubrication system. Use of these systems and methods may prolong the life of the bit or increase the length of time between servicing and maintenance by increasing the amount of time during which the bit has sufficient lubricant or by decreasing the chances of the bit being operated with too little lubricant.

Some embodiments of the present disclosure and associated advantages may be understood by reference to FIGS. 1-8 wherein like numbers refer to same and like parts.

Various features of the present disclosure may be described with respect to roller cone drill bits, support arms, cone assemblies, pressure relief mechanisms, lubricant systems and/or associated components. Some examples are shown in FIGS. 1-8. However, teachings of the present disclosure may be used with a wide variety of roller cone drill bits and associated lubricant systems and are not limited to the embodiments as shown in FIGS. 1-8.

Figure 1:
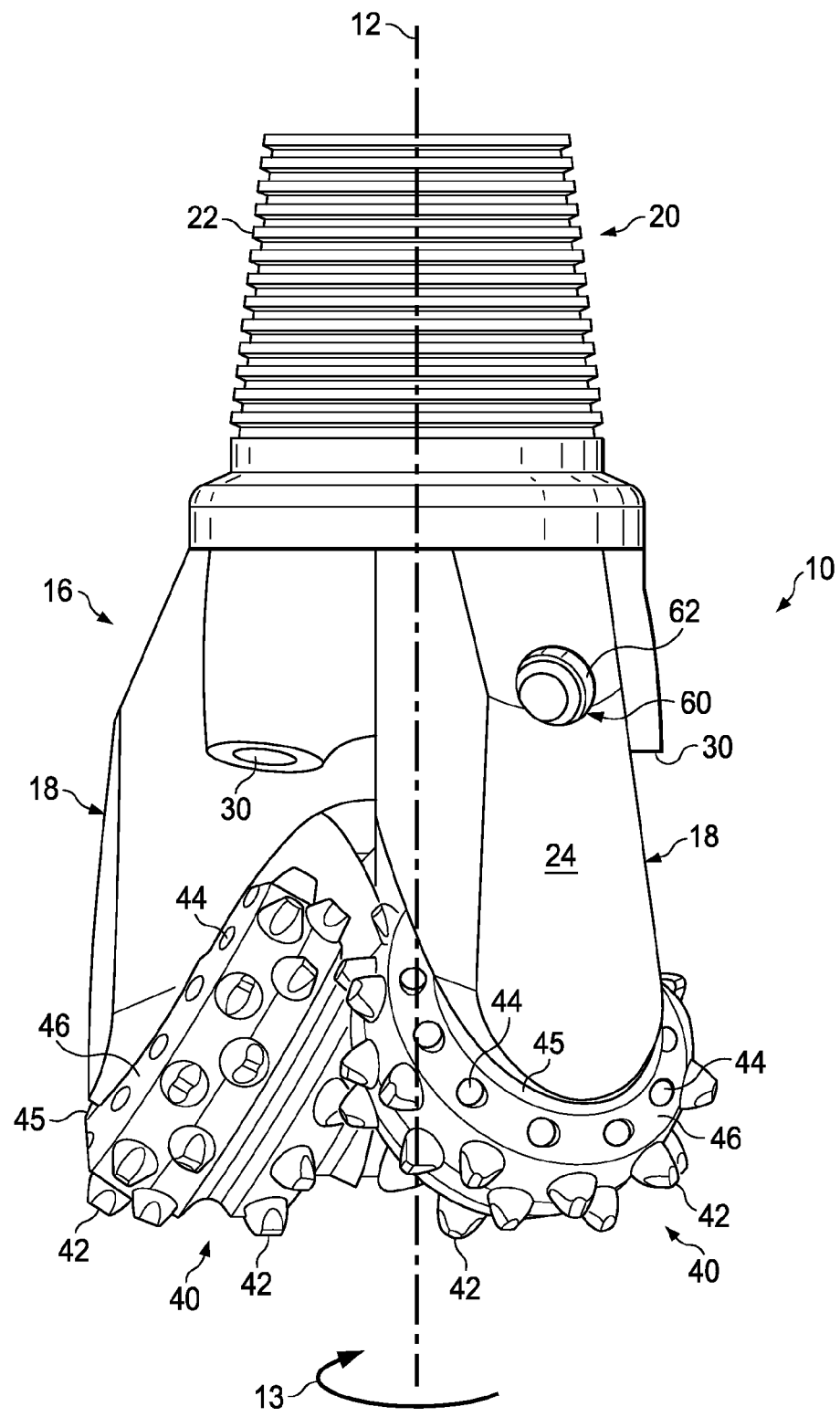
FIG. 1 illustrates a schematic drawing showing an isometric view of one example of a roller cone drill bit, in accordance with embodiments of the present disclosure.

FIG. 1 illustrates a schematic drawing showing an isometric view of one example of roller cone drill bit 10, in accordance with embodiments of the present disclosure. Drill bit 10 as shown in FIG. 1 may be referred to as a "roller cone drill bit," "rotary cone drill bit," "rotary rock bit," or "rock bit." Drill bit 10 may include various types of such bits. Roller cone drill bits may have at least one support arm with a respective cone assembly rotatably disposed thereon.

A drill string (not expressly shown) may be attached to and rotate drill bit 10 relative to bit rotational axis 12. Drill bit 10 may rotate as indicated by arrow 13. Cutting action associated with forming a wellbore in a downhole formation may occur as cone assemblies, indicated generally at 40, engage and roll around the bottom or downhole end of a borehole or wellbore (not shown) in response to rotation of drill bit 10.

Figure 2:
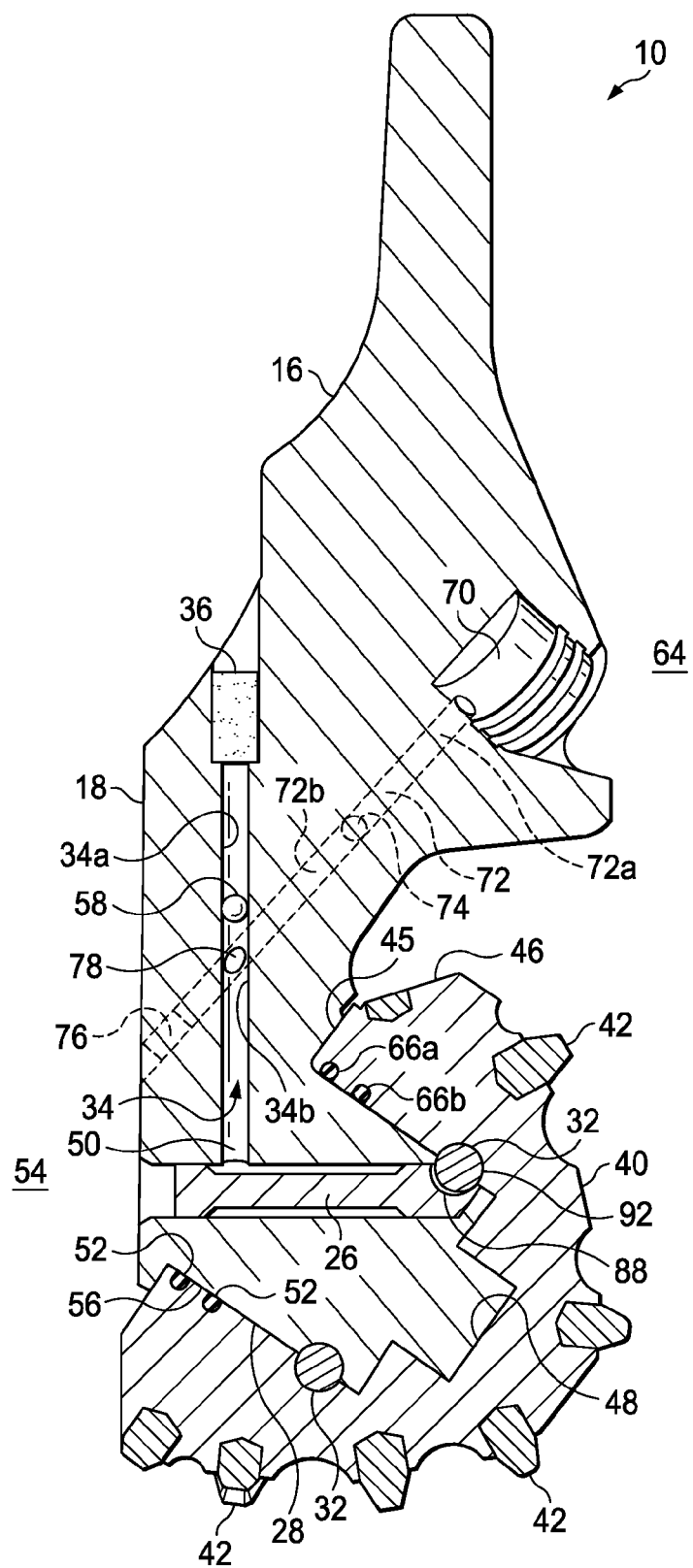
FIG. 2 illustrates a schematic drawing in section with portions broken away showing various components of a roller cone drill bit and an associated lubrication system incorporating a floating bead, in accordance with embodiments of the present disclosure.

Each cone assembly 40 may be attached with and rotate relative to exterior portions of associated spindle or journal 28, as shown in FIG. 2. Cone assembly 40 may be referred to as a "roller cone," "rotary cone cutter," "roller cone cutter," "rotary cutter assembly" and "cutter cone assembly." Each of cone assemblies 40 may include a plurality of cutting elements or inserts 42 which penetrate and scrape against adjacent portions of a downhole formation in response to rotation of drill bit 10. Referring to FIG. 1 and FIG. 2, cone assemblies 40 may also include a plurality of compacts 44 disposed on respective gauge surface 46 of each cone assembly 40. Cutting elements 42 may include various types of compacts, inserts, milled teeth and welded compacts satisfactory for use with roller cone drill bits. Cone assembly 40 may also include generally circular base portion 45.

For some embodiments of the present disclosure, drill bit 10 may include bit body 16 having three support arms 18 extending therefrom. Only two support arms 18 may be seen in FIG. 1, but the teachings of the present disclosure may be used in drill bits with various numbers of support arms 18. Uphole portion or pin end 20 of drill bit 10 may include generally tapered, external threads 22. Threads 22 may be used to releasably engage drill bit 10 with the downhole end of an associated drill string or bottomhole assembly (not expressly shown).

Formation materials and other downhole debris created during impact between cutting elements or inserts 42 and adjacent portions of a downhole formation may be carried from the bottom or end of an associated wellbore by drilling fluid flowing from nozzles 30. Such drilling fluid may be supplied to drill bit 10 by a drill string (not expressly shown) attached to threads 22. Drilling fluid with formation cuttings and other downhole debris may flow upwardly around exterior portions of drill bit 10 and through an annulus (not expressly shown) formed between exterior portions of drill bit 10 and exterior portions of an attached drill string and inside diameter or side wall of the wellbore to an associated well surface (not expressly shown).

Each support arm 18 may include a respective lubricant system 60. Lubricant may refer to any fluid, grease, composite grease, or mixture of fluids and solids satisfactory for lubricating journal bearings, thrust bearings, bearing surfaces, bearing assemblies and/or other supporting structures associated with rotatably mounting one or more cone assemblies on a roller cone drill bit. Lubricant system 60 may include external end or opening 62 adjacent to exterior portion 24 of associated support arm 18.

FIG. 2 illustrates a schematic drawing in section with portions broken away showing various components of roller cone drill bit 10 and an associated lubrication system incorporating floating bead 74, in accordance with embodiments of the present disclosure. Each cone assembly 40 may be rotatably mounted on associated spindle or journal 28 in a substantially similar manner. Accordingly, only one support arm 18, journal 28 and cone assembly 40 will be described in detail. Cone assembly 40 may include generally circular base portion 45 with cavity 48 extending inwardly therefrom. Cavity 48 (sometimes referred to as a "cone cavity") may have a generally cylindrical configuration sized to receive exterior portions of associated spindle or journal 28 therein. Associated gage surface 46 may extend radially outward and be tapered relative to respective base portion 45.

Each support arm 18 may include respective exterior surface 54 and interior surface 64 which are normally exposed to downhole well fluids while forming a wellbore. Each support arm 18 may include respective journal 28 formed as an integral component thereof. Respective cone assembly 40 may be rotatably mounted on each spindle or journal 28. Each spindle or journal 28 may be angled downwardly and inwardly with respect to bit rotational axis 12 of associated support arm 18 so that attached cone assembly 40 may engage the bottom or end of a wellbore (not expressly shown) during rotation of drill bit 10. For some applications, spindle or journal 28 may also be tilted at an angle of zero to three or four degrees in the direction of rotation of drill bit 10 shown by arrow 13, illustrated in FIG. 1.

A wide variety of supporting structures and/or bearing surfaces may be used to rotatably mount each cone assembly 40 on associated spindle or journal 28. For example, bearings or retaining balls 32 may be used between cone assembly 40 and spindle or journal 28 to secure cone assembly 40 on support arm 18. For some applications, bearings or retaining balls 32 may be described as a journal bearing. Bearings or retaining balls 32 may sometimes be described as a thrust bearing. For some applications, bearing surfaces associated with rotatably mounting a roller cone assembly on a spindle or journal may be formed as integral components (not expressly shown) disposed on exterior portions of an associated journal and interior portions of a cavity formed within an associated roller cone assembly. As shown in FIG. 2, retaining balls 32 may be disposed in an annular array (not expressly shown) within associated ball race 88 formed in ball plug 26 and ball race 92 formed in adjacent interior portions of cavity 48 of cone assembly 40. Once inserted, ball bearings 32 may prevent disengagement of cone assembly 40 from journal 28.

Referring to FIG. 2, seals 66a and 66b may be used to prevent debris and well fluids from entering annular gap 56 formed radially between cone assembly 40 and journal 28. Seals 66a and 66b may be received in glands or grooves 52 formed in cone assembly 40. Seals 66a and 66b may be located in cavity 48 proximate an opening in base portion 45 of cone assembly 40. Seals 66a and 66b may be elastomeric seals and may form a fluid seal or fluid barrier between adjacent interior portions of cavity 48 and adjacent exterior portions of journal 28. Seals 66a and 66b may be operable to prevent downhole well fluids, formation cuttings, and/or downhole debris from entering cavity 48 and damaging associated bearing surfaces and supporting structures. Although two seals 66a and 66b are depicted in the drawings, any number of seals (including one) may be used in keeping with the scope of this disclosure. The terms "seal" or "fluid seal" may be used to refer to a wide variety of seals and seal assemblies including, but not limited to, an o-ring seal, t-seal, v-seal, flat seal, lip seal and any other seal or seal assembly operable to establish a fluid barrier between adjacent components or sealing surfaces.

As cone assembly 40 rotates about the journal 28, seals 66a and 66b may rotate with cone assembly 40 and seal against an outer surface of journal 28. However, in other embodiments of the present disclosure, seals 66a and 66b may remain stationary on the journal 28 (e.g., the seals being disposed in grooves formed on the journal), with cone assembly 40 rotating relative to journal 28 and seals 66a and 66b.

If damage occurs to journals, spindles, bearings, bearing assemblies, bearing surfaces, seals and/or other supporting structure associated with rotation of a roller cone or cone assembly relative to an associated support arm and/or lubrication systems to protect such components, the associated roller cone drill bit and attached drill string may generally be removed from the wellbore to replace damaged components and/or to replace the roller cone drill bit.

Filling an intergland lubrication system with lubricant and maintaining desired lubrication in accordance with teachings of the present disclosure may increase downhole drilling life of a roller cone drill bit by maintaining desired lubrication related to seals, bearings, journals, bearing surfaces, bearing assemblies and/or other supporting structures associated with rotation of a roller cone assembly relative to the associated support arm.

In an intergland lubrication system, lubricant may be supplied to bearings or retaining balls 32 from fluidly coupled lubricant chamber 50. Lubricant chamber 50 may be sealed by ball plug 26. Retainer/filter 36 may prevent floating bead 58 from being discharged out of bore 34, and may filter well fluid which enters bore 34. Floating bead 58 may ensure that the lubricant is at substantially the same pressure as the downhole environment at exterior 54 of drill bit 10, when drill bit 10 is being used to drill a wellbore.

Floating bead 58 may be spherically-shaped, and may be spherically shaped (e.g. a full sphere), such that they can rotate without binding within bores 34 while maintaining a sealing engagement with the bore. However, in other embodiments, a circumferential portion which contacts bore 34 may be flattened somewhat or floating bead 58 may have other shapes, such as, cylindrical, barrel-shaped, etc. Any shape may be used for floating bead 58 and 74 in keeping with the scope of this disclosure. In another embodiment, floating bead 58 may be made entirely or at least exteriorly of an elastomer or other resilient material, which will deform somewhat when it sealingly contacts bore 34.

Floating bead 58 may define an exterior section 34a of bore 34 and an interior section 34b of bore 34. Accordingly, the precise location of sections 34a and 34b may change as floating bead 58 moves within bore 34. Interior section 34b of bore 34 may be included as part of the lubricant chamber 50. The sections 34a and 34b of bore 34 may be isolated from fluid communication with each other by the floating bead 58. Pressure across floating bead 58 may become substantially equalized between sections 34a and 34b. With pressure substantially equalized between sections 34a and 34b of bore 34 it may be appreciated that a pressure across seals 66a and 66b may also be substantially zero because seals 66a and 66b may be exposed to the lubricant on one side, and may be exposed to exterior 54 of drill bit 10 on an opposite side.

Drill bit 10 may also contain a primary pressure compensation system that includes lubricant reservoir 70. In prior drill bits, the primary pressure compensation system is arranged such that lubricant is relieved from lubricant reservoir 70 and connected components to the external environment of drill bit 10. As a result, lubricant is lost to the bit during the course of operation of the primary pressure compensation system. In contrast, in drill bits of the present disclosure, the relieved lubricant is instead diverted to the intergland lubrication system.

In FIG. 2, bore 72 may provide fluid communication between lubricant reservoir 70 and lubricant chamber 50 through opening 78. Bore 72 may contain floating bead 74. Floating bead 74 may be made in the same variety of materials and in the same variety of shapes as floating bead 58. However, within a given drill bit 10, floating beads 58 and 74 may be made of different materials and have different shapes. Bore 72 may also contain plug 76 which may prevent passage of floating bead 74 and which may optionally also seal the end of bore 72.

Bore 72 may be configured on a different plane and at varied angles from bore 34. For example, as shown by the dotted lines in FIG. 2, bore 72 may be located under or to the left of bore 34. However, bore 72 and bore 34 may be close enough such that opening 78 is formed at the intersection of bore 72 and bore 34. Opening 78 may be sized such that neither floating bead 58, nor floating bead 74 may pass through opening 78, so that each floating bead remains in the appropriate bore. Opening 78 and floating bead 58 and 74 may also be configured and constituted so that the floating beads do not become irretrievably lodged in opening 78.

In operation, pressure may increase in lubricant reservoir 70 and may force floating bead 74 in the direction of plug 76. As floating bead 74 passes over opening 78, the pressurized lubricant may enter bore 34. Friction between floating bead 74 and a wall of bore 72 may cause some variation in pressure between the upper section 72a and lower section 72b of bore 72, but floating bead 74 may displace in bore 72 to relieve all most pressure differentials across floating bead 74. The sections 72a and 72b of bore 72 may be isolated from fluid communication with each other by the floating bead 74.

Figure 3:
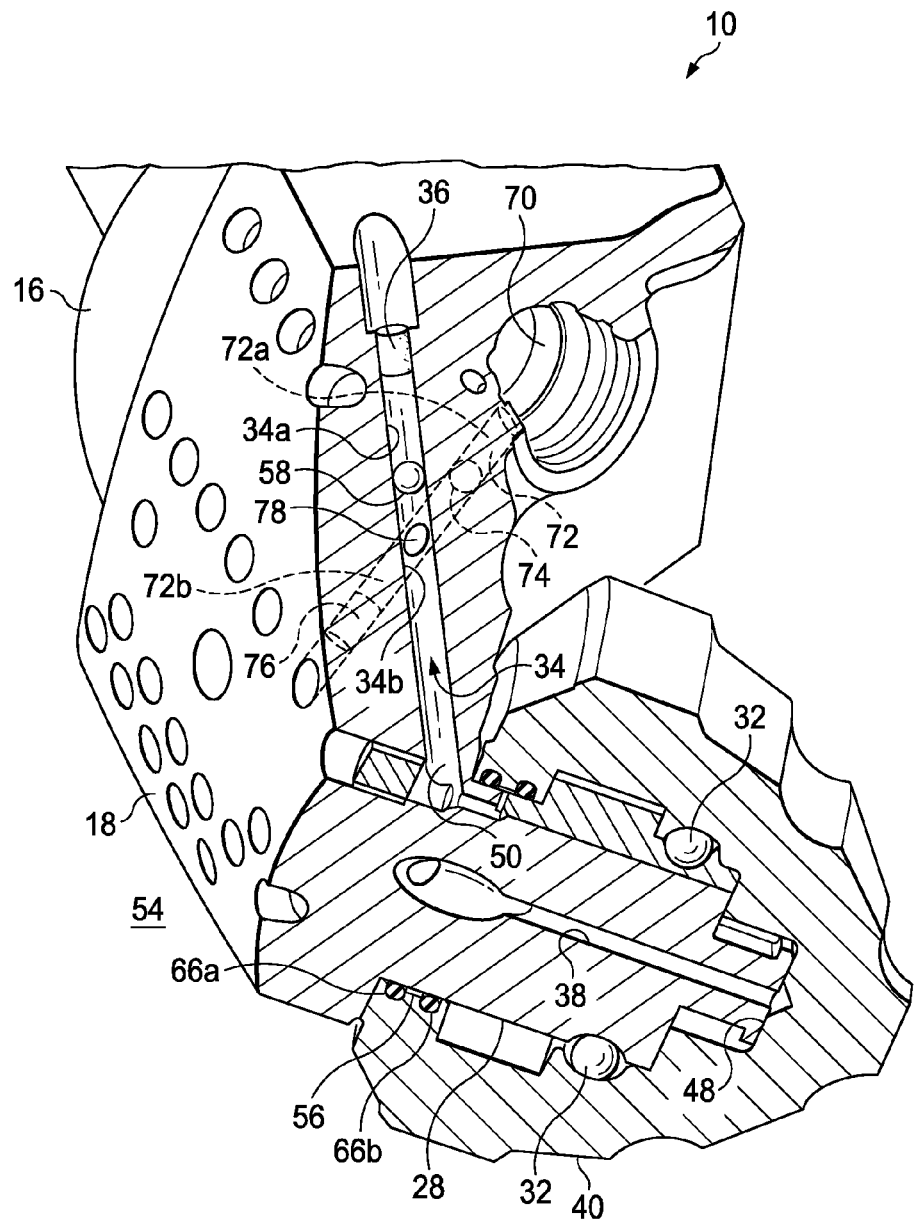
FIG. 3 illustrates a schematic drawing showing an isometric view of a drill bit with portions broken away showing an associated lubrication system incorporating a floating bead, in accordance with embodiments of the present disclosure.

FIG. 3 illustrates a schematic drawing showing an isometric view of drill bit 10 with portions broken away showing an associated lubrication system incorporating an opening 78 connecting lubricant reservoir 70 with lubricant chamber 50, in accordance with embodiments of the present disclosure. FIG. 3 illustrates an alternative embodiment of the general system of FIG. 2 in which retaining balls 32 are housed in a different configuration and additional lubrication features are shown. In the embodiment of FIG. 3, lubricant chamber 50 is connected to passage 38, which extends to a lower end of the journal 28 for enhanced supply of lubricant to the interface between the journal 28 and the cone assembly 40.

Figure 4:
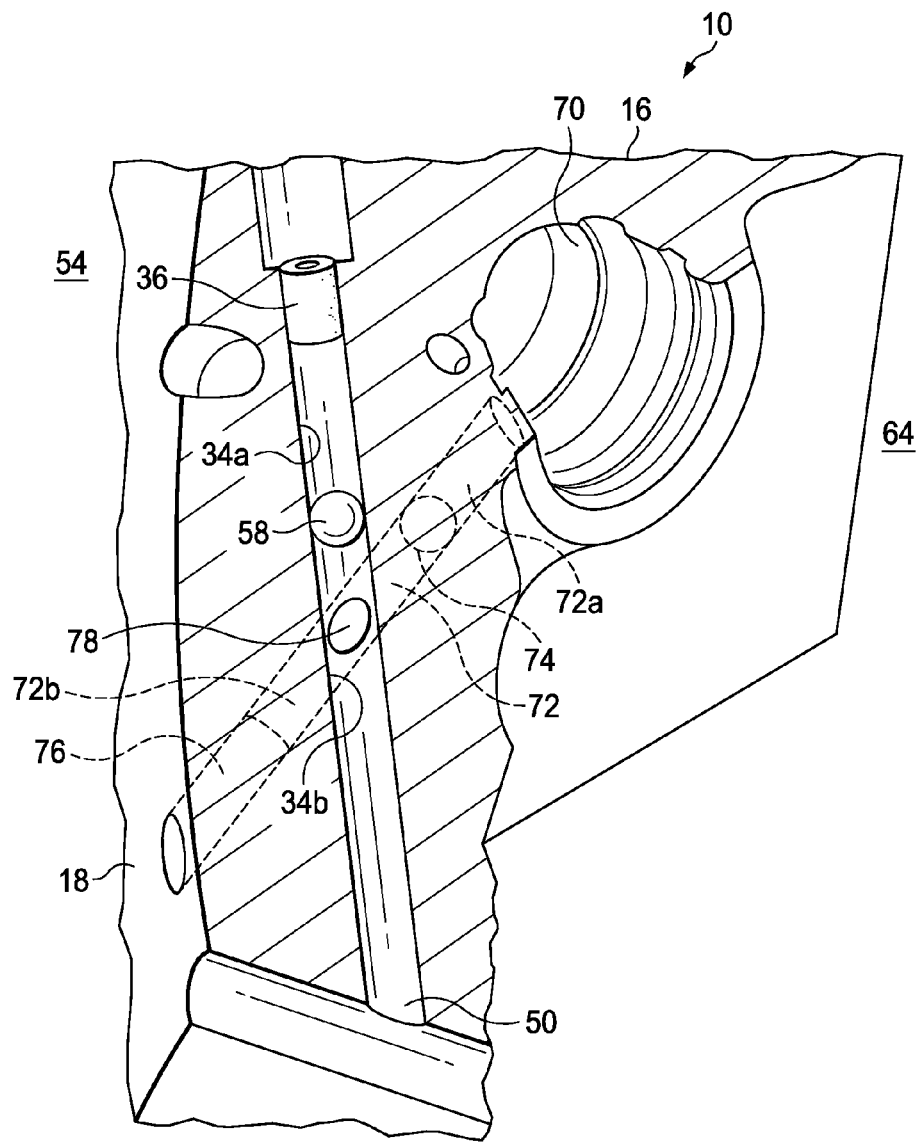
FIG. 4 illustrates a schematic drawing showing an isometric view of a drill bit with portions broken away showing an expanded view of an intersection, in accordance with embodiments of the present disclosure.

FIG. 4 illustrates a schematic drawing showing an isometric view of drill bit 10 according to the general embodiments shown in FIGS. 2 and 3 with portions broken away showing an expanded view of intersection 78. Intersection 78 may be the point at which bore 34 and bore 72 intersect. Although shown as an ellipse, intersection 78 may be an opening of any shape, such as, square, rectangular, circular, and/or any other suitable shape. Intersection 78 may be sized such that floating beads 58 and 74 may not pass through or become irretrievably lodged (e.g. lodged in such a manner that they may not be dislodged even by pressure differences) in intersection 78. For example, floating beads 58 and 74 may be larger than intersection 78 or floating beads 58 and 74 may be shaped in order to restrict floating bead 58 and 74 from entering bore 34 via intersection 78.

In certain embodiments of the present disclosure, intersection 78 may be located such that there may be a clearance between plug 76 and intersection 78. In other embodiments, there may not be clearance between plug 76 and intersection 78 such that floating bead 74 may not completely pass intersection 78 before contacting plug 76.

Figure 5:
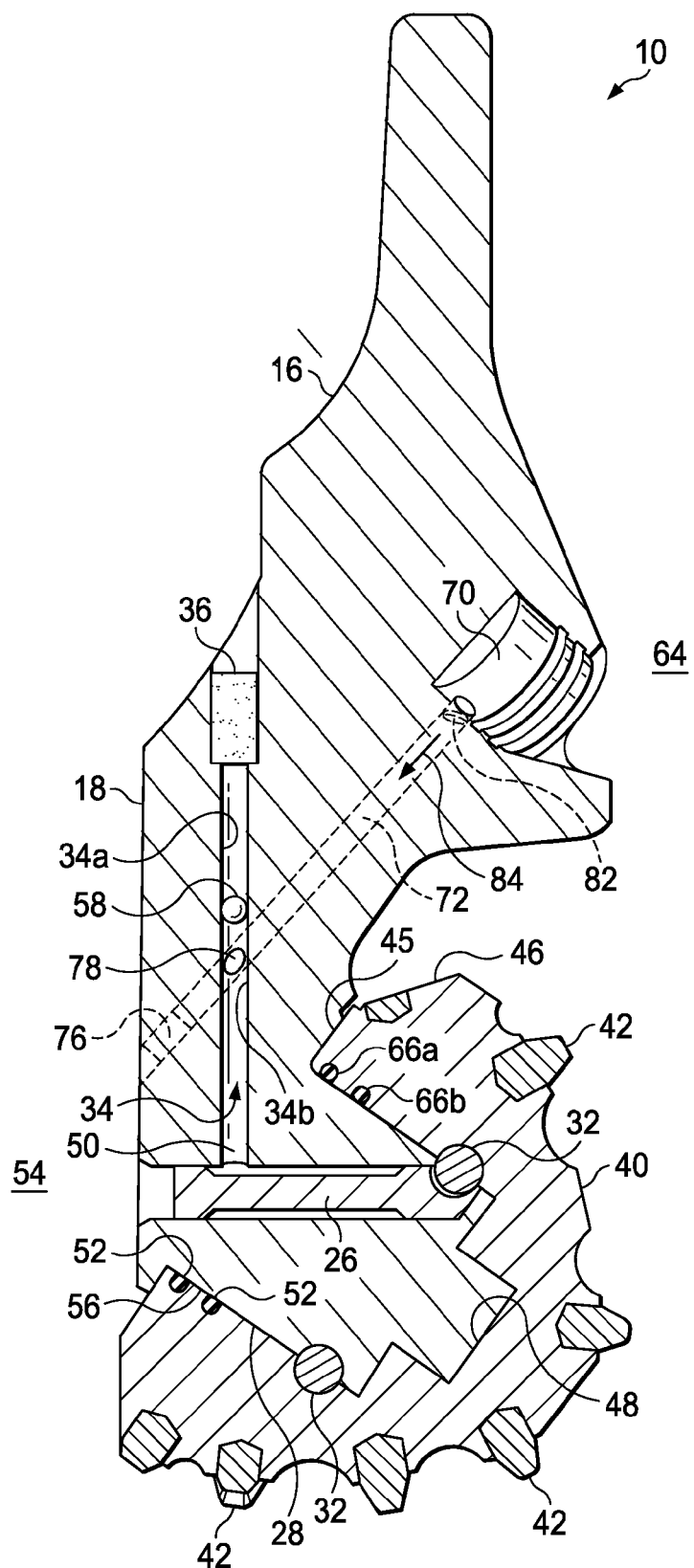
FIG. 5 illustrates a schematic drawing in section with portions broken away showing various components of a roller cone drill bit and an associated lubrication system incorporating a check valve, in accordance with embodiments of the present disclosure.

FIG. 5 illustrates a schematic drawing in section with portions broken away showing various components of roller cone drill bit 10 and an associated lubrication system incorporating check valve 82, in accordance with embodiments of the present disclosure. In the present embodiment, check valve 82 may be coupled to bore 72. Check valve 82 may allow lubricant to flow from lubricant reservoir 70 into bore 72 in a direction shown by lubricant flow arrow 84. However, check valve 82 may be configured to restrict lubricant flow from bore 72 into reservoir 70. Check valve 82 may be located at any point in bore 72 between lubricant reservoir 70 and opening 78. Use of check valve 82 may preclude or render unnecessary the use of floating bead 74 shown in FIGS. 2-4. Check valve 82 may be any appropriate size to allow full function of check valve within bore 72.

Figure 6:
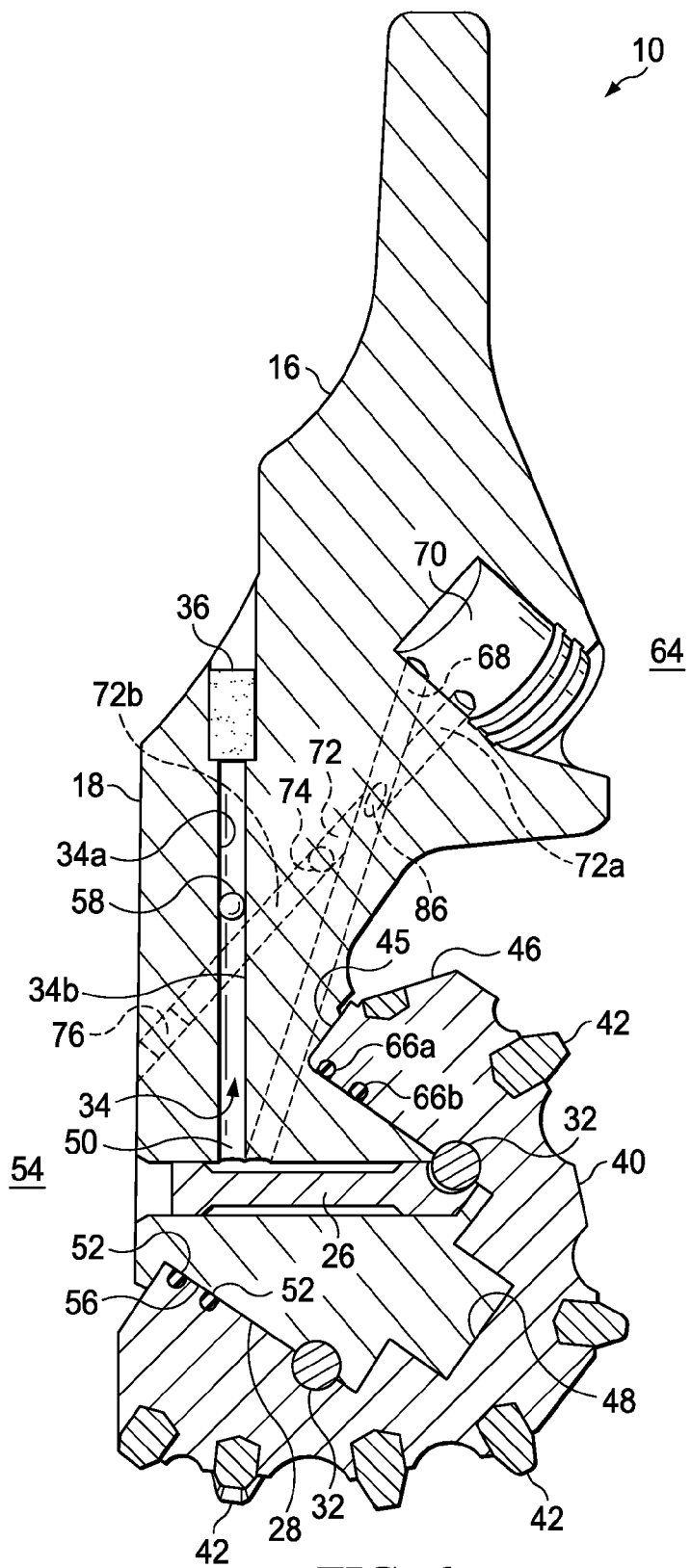
FIG. 6 illustrates a schematic drawing in section with portions broken away showing various components of a roller cone drill bit and an associated lubrication system incorporating a longhole, in accordance with embodiments of the present disclosure.

FIG. 6 illustrates a schematic drawing in section with portions broken away showing various components of roller cone drill bit 10 and an associated lubrication system incorporating longhole 68, in accordance with embodiments of the present disclosure. In the present embodiment, longhole 68 may be a bore that connects lubricant reservoir 70 and lubricant chamber 5 via opening 86. Opening 86 maybe formed by the intersection of bore 72 and longhole 68, which may be disposed on different planes. Opening 86 may be similar to opening 78 as described with respect to FIGS. 2-4. However, because longhole 68 does not intersect bore 34, the complexities of an intersection of two bores, both containing a floating bead, may be avoided.

Depending on the pressure in lubricant chamber 70, floating bead 74 may move within bore 72 to either allow or prevent the movement of lubricant through opening 86 in much the same way as floating bead 74 moves within bore 72 to allow or prevent movement of lubricant through opening 78 in the embodiments shown in FIGS. 2-4.

Although shown as an ellipse, intersection 86 may be an opening of any shape, such as, square, rectangular, circular, and/or any other suitable shape. Intersection 86 may be sized such that floating bead 74 may not pass through intersection 86. For example, floating bead 74 may be larger than intersection 86 or floating bead 74 may be shaped in order to restrict floating bead 74 from entering bore 68 via intersection 86.

In certain embodiments of the present disclosure, intersection 86 may be located such that there may be a clearance between lubricant reservoir 70 and intersection 86. In other embodiments, there may not be clearance between lubricant reservoir 70 and intersection 86 such that floating bead 72 may not completely pass intersection 78 before contacting lubricant reservoir 70.

Figure 7:
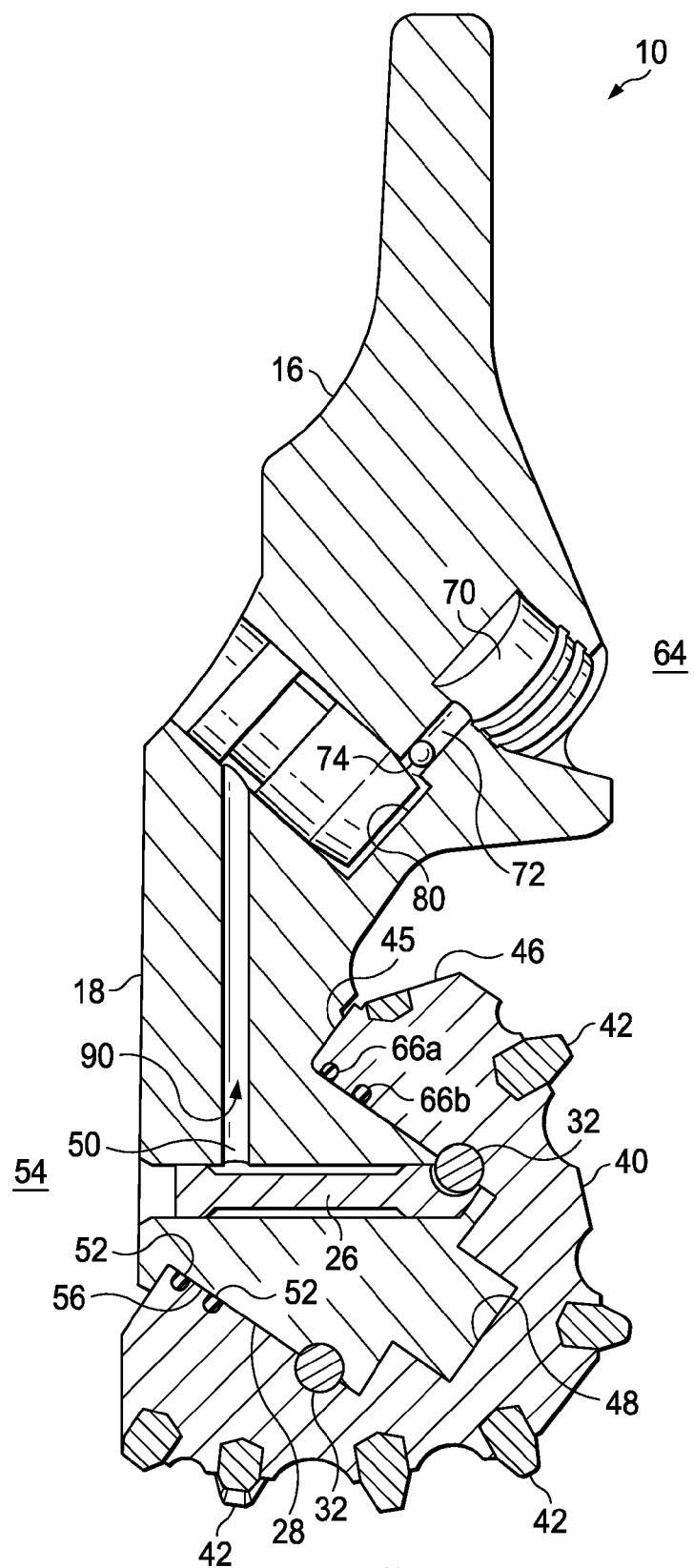
FIG. 7 illustrates a schematic drawing in section with portions broken away showing various components of a roller cone drill bit and an associated lubrication system incorporating two lubricant reservoirs, in accordance with some embodiments of the present disclosure.

FIG. 7 illustrates a schematic drawing in section with portions broken away showing various components of roller cone drill bit 10 and an associated lubrication system incorporating two lubricant reservoirs 70 and 80, in accordance with some embodiments of the present disclosure. Drill bit 10 illustrated in FIG. 7 may be larger than drill bit 10 shown in FIGS. 2-6, e.g., larger than a 12.5" drill bit. Accordingly, the present embodiment may include two lubrication reservoirs 70 and 80. Lubricant reservoir 70 may be connected via bore 72 to lubricant reservoir 80. Floating bead 74 may be configured to move in bore 72 such that the pressure in lubricant reservoirs 70 and 80 remains substantially equalized. When floating bead 74 is at the end of bore 72 near lubricant reservoir 80, lubricant may pass from lubricant reservoir 70 into lubricant reservoir 80. It may then pass through longhole 90 to reach lubricant chamber 50. Floating bead 74 may be configured and made of a material adequate to allow passage of fluid around floating bead 74 into the lubricant chamber 80.

Figure 8A:
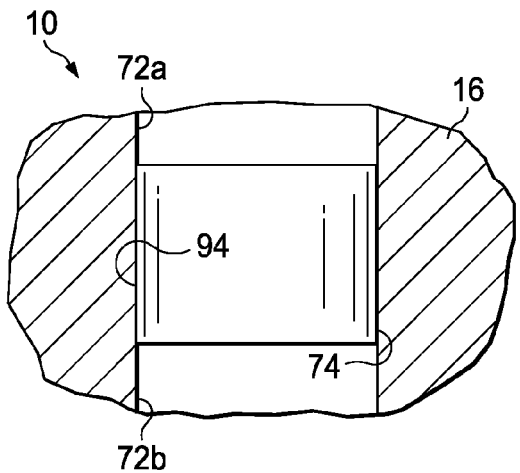
FIGS. 8A-C illustrate example cross-sectional views of different floating beads that may be used in an associated lubrication system, in accordance with some embodiments of the present disclosure.
Figure 8B:
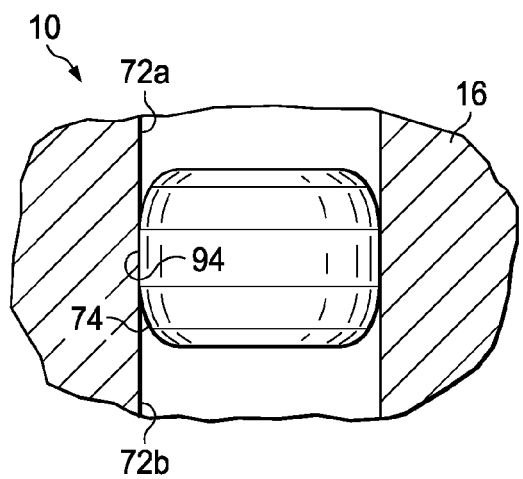
Figure 8C:
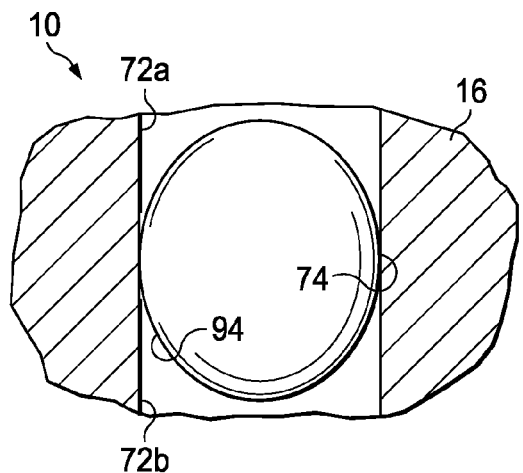

FIGS. 8A-C illustrate example cross-sectional views of different floating beads 74 (or 58) that may be used in an associated lubrication system, in accordance with some embodiments of the present disclosure. The example configurations and shapes of floating beads are merely a few examples of a wide variety of different beads that may be used, and it should be clearly understood that the scope of the disclosure may not be limited to only the specific shapes and types of plugs described herein.

FIGS. 8A-C illustrates a floating bead 74 that may be made of an elastomer sealing material. Bead 74 may be configured to move within bore 72 based on the associated pressure difference on each side of bead 74. Bead 74 may further be configured to engage bore 72 anywhere on outer surfaces 94. In FIG. 8A, bead 74 may be cylindrical shaped. In FIG. 8B, bead 74 may have a curved, parabolic-shaped outer surface that may mitigate binding in bore 72. In FIG. 8C, bead 74 may have an elliptical-shaped outer surface.

Although the present disclosure and its advantages have been described in detail, it should be understood that various changes, substitutions and alternations can be made herein without departing from the spirit and scope of the disclosure as defined by the following claims.

What is claimed is:

1. A roller cone drill bit comprising:
   a bit body having at least one support arm extending therefrom;
   a cone assembly containing bearings or retaining balls and rotatably mounted on a journal extending from each support arm;
   a lubricant reservoir disposed in each support arm;
   a lubricant chamber disposed in each support arm and fluidly coupled to the bearings or retaining balls;
   a bore disposed in each support arm to communicate lubricant between the lubricant reservoir and the lubricant chamber; and
   a pressure release mechanism comprising a floating bead operable to move within the bore in response to pressure within the lubricant reservoir, the pressure relief mechanism disposed within the bore, the pressure release mechanism operable to relieve lubricant from the lubricant reservoir into the lubricant chamber when lubricant pressure within the lubricant reservoir exceeds pressure of the lubricant in the lubricant chamber.

2. The drill bit of Claim 1, wherein the floating bead is substantially spherical.

3. The drill bit of Claim 1, wherein the floating bead is substantially cylindrical.

4. The drill bit of Claim 1, wherein the floating bead is substantially parabolic.

5. The drill bit of Claim 1, wherein the bore contains an opening allowing lubricant communication from the lubricant reservoir to the lubricant chamber, wherein the floating bead may move over, but may not pass through or become irretrievably lodged in the opening.

6. The drill bit of claim 5, wherein the opening is formed by the intersection of the bore with an additional bore.

7. The drill bit of claim 6, wherein the additional bore comprises an additional floating bead, wherein the additional floating bead may not pass through or become irretrievably lodged in the opening.

8. The drill bit of claim 1 wherein the pressure relief mechanism further comprises a check valve.

9. The drill bit of claim 1, further comprising:
an additional lubricant reservoir disposed in each support arm and in fluid communication with the lubricant chamber, wherein the bore and pressure relief mechanism are disposed between the lubricant reservoir and the additional lubricant reservoir.

10. A method for lubricant pressure relief comprising relieving a lubricant from a lubricant reservoir into a lubricant chamber whenever pressure in the lubricant reservoir exceeds pressure in the lubricant chamber by opening a pressure relief mechanism, wherein the pressure relief mechanism is disposed in a roller cone drill bit comprising:
 a bit body having at least one support arm extending therefrom;
 a cone assembly containing bearings or retaining balls and rotatably mounted on a journal extending from the support arm;
 the lubricant reservoir disposed in the support arm;
 the lubricant chamber disposed in the support arm and fluidly coupled to the bearings or retaining balls;
 a bore disposed in the support arm to communicate lubricant between the lubricant reservoir and the lubricant chamber; and
 the pressure release mechanism comprising a floating bead and disposed within the bore, wherein relieving the lubricant comprises the bead moving to allow the lubricant to be relieved.

11. The method of Claim 10, wherein the bore contains an opening allowing lubricant communication from the lubricant reservoir to the lubricant chamber, wherein the floating bead may move over, but may not pass through or become irretrievably lodged in the opening, and wherein relieving the lubricant comprises moving the floating bead into a position with respect to the opening such that lubricant may flow through the opening.

12. The method of claim 10, wherein the pressure relief mechanism further comprises a check valve and relieving lubricant comprises opening the check valve.

\* \* \* \* \*